May 23, 1961 E. H. GATZERT 2,985,721

TELEPHONE ANSWERING SERVICE SYSTEM

Filed April 28, 1958 5 Sheets-Sheet 1

INVENTOR
ERNEST H. GATZERT
BY Henry H Gage
AGENT

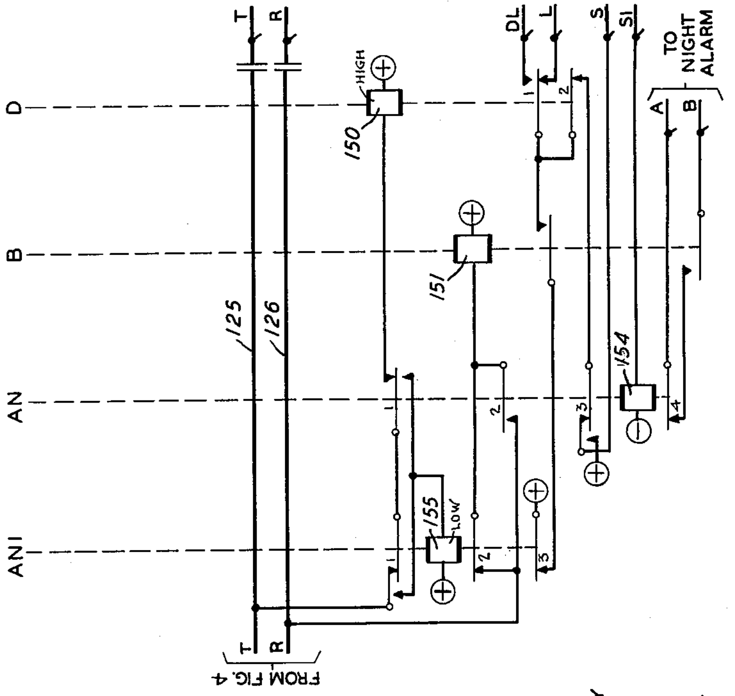
FIG. 5 ANSWERING TRUNK
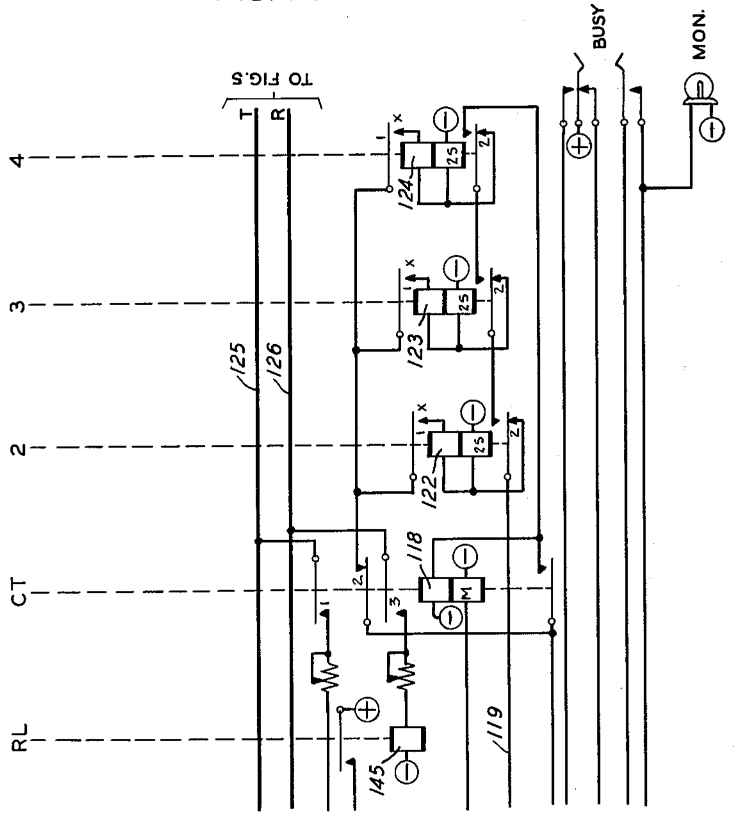
FIG. 4

EXCHANGE LINE
KEY TERMINATION

ANSWER
KEY TERMINATION 2,985,721

TELEPHONE ANSWERING SERVICE SYSTEM

Ernest H. Gatzert, Rochester, N.Y., assignor to General Dynamics Corporation, Rochester, N.Y., a corporation of Delaware Filed Apr. 28, 1958, Ser. No. 731,399

4 Claims. (Cl. 179—27)

This invention relates to telephone systems and particularly to switching systems whereby calls incoming to the lines of subscribers to an answering service may be given attention during the absence of the individual subscribers.

The object of the invention is to provide a means for extending certain telephone lines to a distant operator's position while maintaining the identity of each completely unknown to the operators and rendering such lines completely unapproachable to the operators excepting through conventional means available to all telephone users.

The invention consists of a switching system which employs a concentration means for extending connections from a plurality of subscriber lines to be extendable to a secretarial answering service, instead of having each line extended from an exchange to some other location. Thereby calls to such lines may be answered by the attendants at a distant location without the necessity of providing an unnessarily expensive installation of lines between the exchange and such distant location. Where traffic studies show that five or seven lines between the exchange and the location of the answering bureau will provide adequate service for one hundred subscribers to such service, the economy of such an arrangement will become at once apparent. Accordingly, the present invention includes the arrangement of a small number of line finders each arranged to serve one hundred incoming lines and to extend a found line over a simple two wire circuit to an answering bureau. The invention in this case consists of the circuitry whereby signals and control circuits for properly controlling the line finder at one end and the signaling and answering means at the other end may be transmitted and controlled over a small group of such two wire circuits.

The advantages of the system herein disclosed include economy and complete privacy for the subscribers to such a secretarial answering service. It needs no argument to establish the fact that great economy flows from the use of only five to seven two wire lines extending from the exchange to the location of the service bureau instead of one hundred, and this economy also extends to the freedom of movement gained by the service bureau when and if a change in location is necessary. It also needs no argument to establish the desirability of complete privacy. In accordance with the present arrangement the operators are completely unable to monitor any line subscribing to this service excepting such a line which has been specifically extended to her location and specifically for her attention and even in such a case she has no way other than by inquiry of the calling party for identifying such a line.

A feature of the invention is the use of means responsive to a call incoming to a subscriber's line effective only so long as such call remains unanswered by the subscriber for extending such line to a distant point and for signaling such distant point only so long as such extended call still remains unanswered by either the subscriber or by an attendant at such distant point. In accordance with the present invention the means for extending an unanswered call will be released at any time the subscriber answers excepting only if the distant answering bureau attendant answers first. Should such a call be extended to the answering bureau and should there be delay in answering at such bureau and further, should the subscriber himself answer during this delay period or should the calling subscriber abandon the connection, then the opportunity for the service bureau attendant to make connection to the line will be lost.

A feature of the invention is therefore means under control of an answering service bureau attendant to make connection to a line only while an unanswered call exists on such line. A further feature of the invention is a means under control of such an attendant for maintaining such an established connection only by continuity of attention for any release on her part will result in an immediate loss of the connection.

Another feature of the invention is a means for extending a connection from an exchange to a distant location responsive to the application of ringing current to a line in said exchange and the maintenance of such extended connection prior to seizure at said distant location responsive to the continued application of ringing current to said line. In accordance with this feature a line is unanswered only so long as the ringing current is being applied thereto and it and any extension thereof to an answering bureau will be maintained only in response to such continued application of ringing current. Further, in response to this feature the extended connection is provided with control means consisting of a slow releasing means, operated by and during the ringing interval of ringing current and holding over the silent intervals through its slow releasing characteristics.

Another feature of the invention is a timing means depending on the counting of the number of cycles of ringing current applied to the line to determine that the call is, what may fairly be termed, unanswered. The special line circuit attached to the line for this purpose and which is disclosed in my copending application Serial Number 657,681, filed May 7, 1957, may be arranged in at least two different ways, in one of which the line finder is arranged for immediate response and in another way where it is arranged for a delayed response. Where such special line circuit is arranged for immediate response, the line finder will immediately seek this line and, finding it, will immediately operate the calling signal at the distant end of the line in which the line finder terminates. Where such special line circuit is arranged for delayed response, then a predetermined number of ringing cycles are counted in the special line circuit before the allotter circuit is enabled and after the calling line has been found another predetermined number of ringing cycles are counted before the distant signal for the answering bureau attendant is operated.

In any case it will be noted that the application of ringing current in the conventional cyclic arrangement is necessary both to enable the line finder and to hold it in connection with the unanswered line until the answering bureau attendant answers and if this cyclically applied ringing current is lost, as through the answer of the subscriber himself or the abandonment of the connection, then the line finder will release and the answering bureau attendant will fail to hold the connection.

Another feature of the invention is an arrangement whereby the response of the answering bureau attendant becomes effective only during the ringing cycle because of the circuitry within the line finder where a relay is provided to follow the recurring ringing cycles in order to control the timing relay to hold the line finder. This relay applies the ring trip relay to the answering attendant's end of the line only during the ringing cycle and the ring trip relay in turn applies a bridge to the calling line whereby a ring trip relay in the exchange connector may be properly operated.

Another feature of the invention is the use of a common battery at the central office for complete signaling in both directions over the lines extended from the exchange to the answer service burea, the only local battery at such bureau being used for the operation of local circuits.

Other features will appear hereinafter.

The drawings consist of five sheets having eight figures, as follows:

Fig. 4 is a schematic circuit diagram showing the outgoing end of a trunk in which the line finder of Fig. 3 terminates;

Fig. 5 is a schematic circuit diagram of the incoming end of the trunk, connected to the trunk of Fig. 4 and which is located at a distant point;

Figures 1, 2:
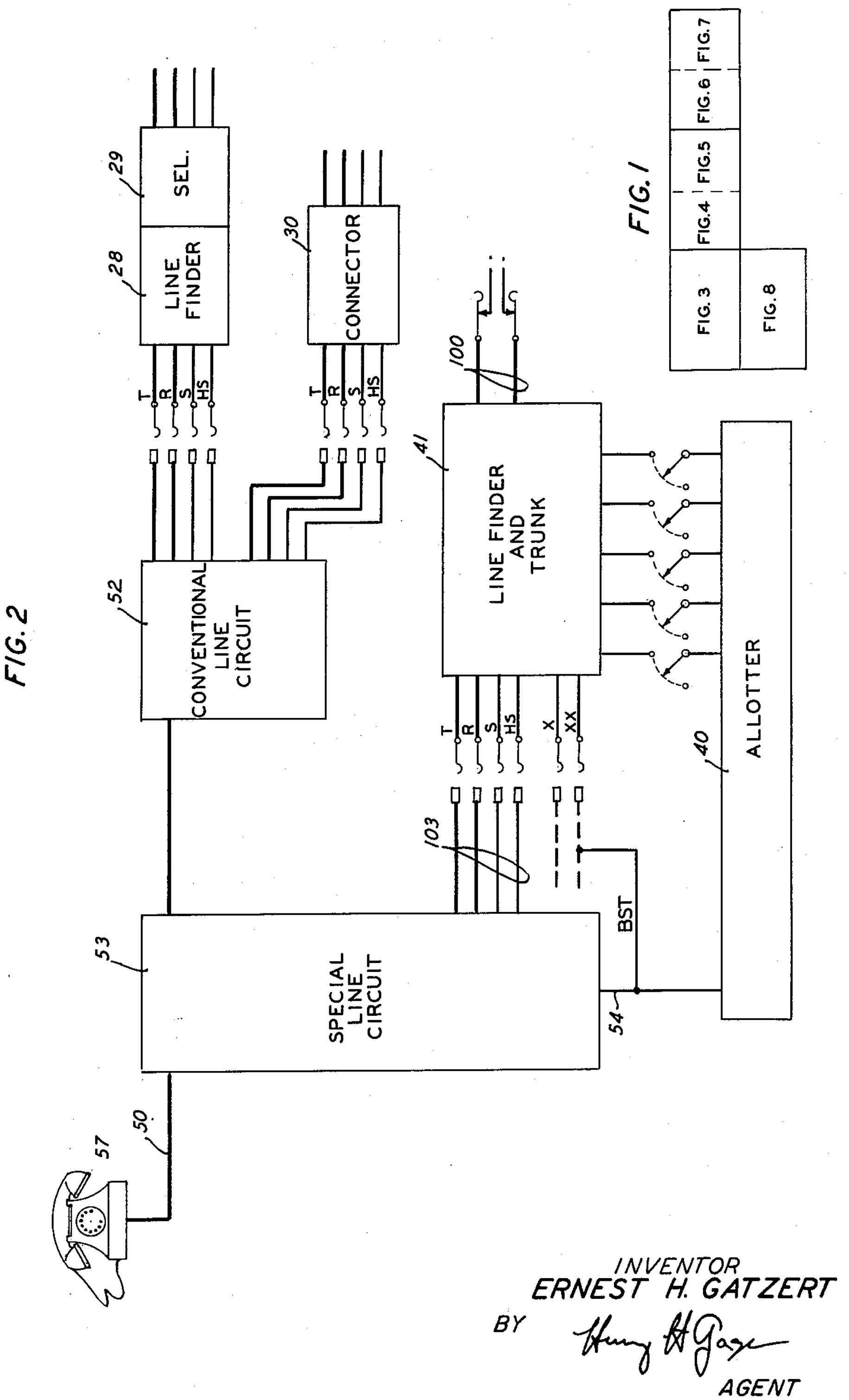
Fig. 1 is a block diagram showing how Figs. 3 to 8 inclusive may be placed to provide a complete circuit diagram embodying the present invention.
Fig. 2 is a block diagram showing the combination of circuit elements including the circuits of Fig. 1, employed in the system embodying the present invention.

Looking first at Fig. 2, it is to be noted that with the exception of the circuit details of the allotter 40 and the line finder 41 as well as the circuitry of the line 100 from this line finder to the answering service bureau, this system is disclosed in detail in my copending application, Serial Number 657,681, filed May 7, 1957. In accordance therewith, a line 50 leading to a station 51 provided with a conventional line circuit 52 for handling incoming calls from the connector 30 and outgoing calls over the line finder 28 and selector 29 may also be provided with an adapter circuit herein shown as a special line circuit 53. When and if an incoming call to the station 51 remains unanswered for a given predetermined period, the special line circuit 53 will enable the allotter start circuit, whereby the line finder 41 will operate to pick up this line 103 and to extend it to an operator's position at the answering service bureau.

It will be noted in the disclosure in my said pending application that certain optional wiring is provided whereby the response of the line finder may be delayed or it may be effected immediately, thus providing for two variations in the answering service which may be offered, the first in which the subscriber at station 51 is given an opportunity to answer an incoming call without alerting the allotter and line finder and the second in which the subscriber wishes to have all incoming calls answered by the service bureau. It is further to be noted that a call extended from the line 50 over the line finder 41 is not identified to the operator at the service bureau, nor may such an operator reach the line 50 except by establishing a regular connection from her exchange line (terminating in Fig. 7) over the connector 30. It would be possible for such an operator to test the working of the present system by establishing such a regular connection and then noting that she had completed a reverting connection when in response thereto the call came in for answering.

*Detailed operation*

In the following description only so much of the allotter circuit as is necessary to an understanding of the present invention is shown. The switch employed is a step-by-step switch arranged to move its four brushes first in an X or primary direction to select a group of terminals and thereafter in a Y or secondary direction to select a particular set of terminals in the selected group. The switch also has a pair of brushes known as the X and XX brushes which move only during the X movement of the switch and which select terminals corresponding to the number of steps taken by the switch in the X direction.

Figure 8:
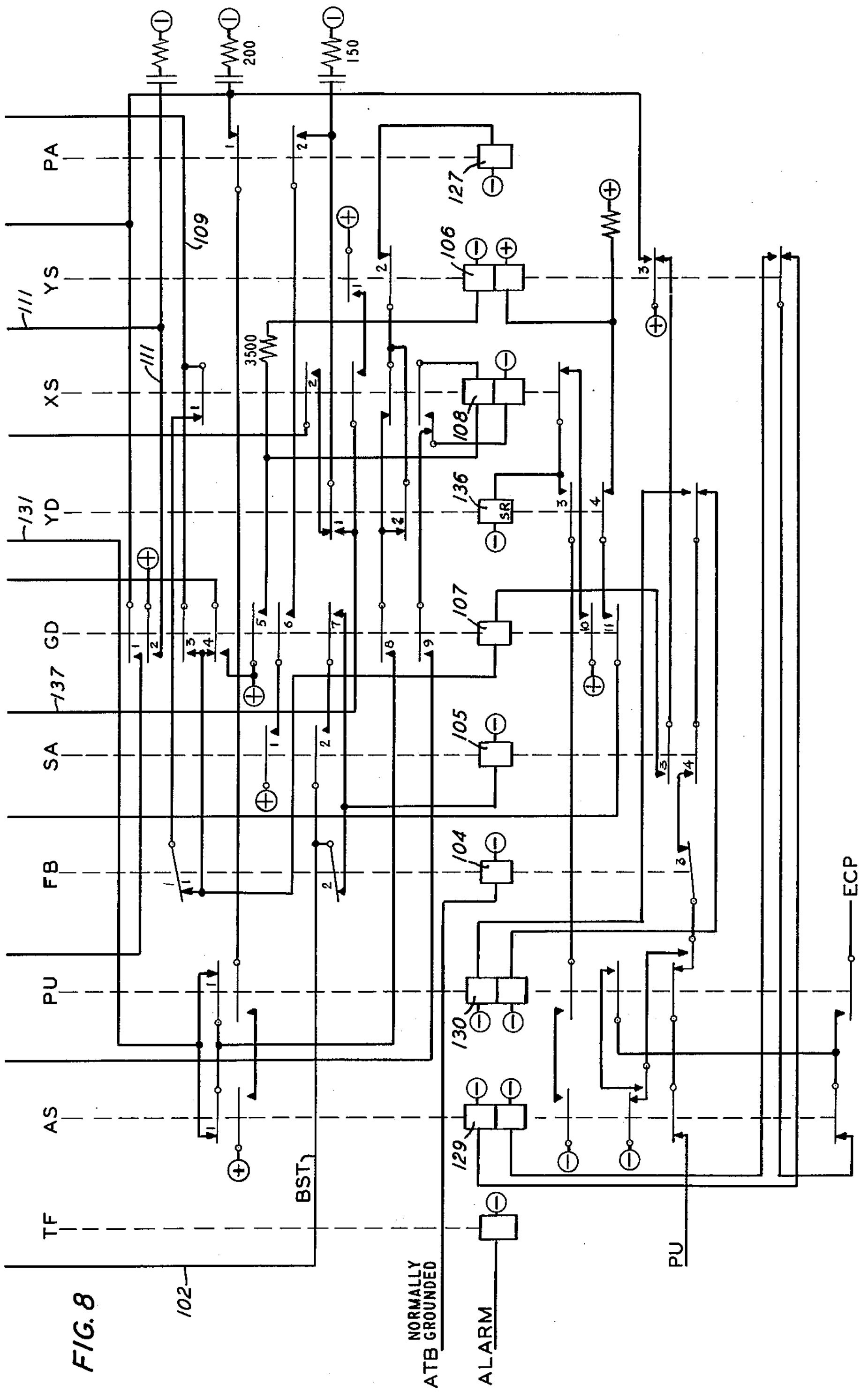
Fig. 8 is a schematic circuit diagram showing so much of the allotter circuit as is necessary for a clear understanding of the operation of the line finder of Fig. 3.

It has been stated hereinbefore that when a call is extended to a subscriber's telephone and it remains unanswered for a given period, a ground will be placed on the start wire 54 of the allotter. This is shown in the present Fig. 3 and Fig. 8 as the wire BST. It may be noted that in the present showing only one of a pair of allotters conventionally employed is shown and the BST wire is employed for starting this one (the AST wire being used to start the other). The BST wire is also connected to one of the terminals traversed by the XX brush to mark the primary group in which the calling line is contained. In like manner, the AST wires will be connected to terminals traversed by the X wiper. The grounding of the BST wire will start the operation of the allotted line finder.

For purposes of description it will be assumed that the calling line is number 21, that is, it is in the second group of lines reached in the primary direction and is the first line reached in that group in the secondary direction.

When the BST wire is grounded, a circuit will be established from such ground through the resistor 101, the conductor 102, an armature and front contact of the normally operated FB relay 104 and thence through the winding of the SA relay 105. This completes a circuit from ground, the armature 3 and back contact of the YS relay 106, the armature 3 and front contact of the SA relay 105, the winding of the GD relay 107, the front contact and normally operated armature 1 of the FB relay 104, the back contact and armature 1 of the XS relay 108, the wire 109, the interrupter contacts of the RX allotter stepping magnet 110 to battery. The resistance of the GD relay 107 is comparatively high whereas the resistance of the magnet 110 is comparatively low, whereby the relay 107 operates but the magnet 110 does not operate. This results in grounding the ST wire 111, from ground, armature 2 and front contact of the GD relay 107, wire 111, the brush 112 of the allotter switch, now assumed to be standing on the wire 113 and thence through the ST relay 114 to battery. The ST relay operates.

The operation of the ST relay 114 closes a circuit from ground, resistance 115, winding of the RU relay 116, armature 2 and back contact of the RT relay 117 and thence through the lower winding of the CT relay 118 to battery. The CT relay is of a comparatively high resistance and will not respond with the resistance 115 in circuit therewith. The RU relay, however, responds immediately.

The RU relay 116 now closes a ground on its armature 3 to the conductor used for operating the 2, 3 and 4 ringing cycle counting relays 122, 123 and 124 respectively. This ground, extended through the back contact and armature 2 of relay 122 and the lower winding thereof to battery will energize this relay sufficiently to cause it to close its X contact only, whereupon this condition will be maintained until the finder has found the calling line and the first ringing cycle thereafter has been counted, as will appear hereinafter.

The RU relay, by its armature 2, also closes a circuit to operate the TMG relay, and this relay provides a sleeve ground on conductor 121 and opens the talking circuit to the tip and ring conductors 125 and 126 for the time being.

*Finding the calling line*

The PA relay 127 relay now operates in a circuit from battery, the winding of the PA relay 127, the back contact and armature 2 of the YS relay 106, the armature 4 and back contact of the XS relay 108, the armature 8 and front contact of the GD relay 107, thence in parallel through the armature 1 and back contact of both the AS relay 129 and the PU relay 130, the PA wire 131 through the corresponding PA wiper of the allotter switch, the X magnet interrupter contacts 132, the Y magnet interrupter contacts 133, the overflow OF contacts 134, the front contact and armature 3 of the ST relay 114, the back contact and armature 7 of the SW relay 135 to a ground supplied by the busy key on the supervisory shelf, which for our present purposes may be considered a firm ground connection to this armature 7. The PA relay is the conventional stepping aid relay which is in a mutual control circuit with the stepping magnet of the switch, whereby the relay brings about the energization of the magnet and this when fully completed releases the relay to start another stepping operation. Thus the operation of the PA relay 127 closes a circuit from ground, armature 1 and front contact of the SA relay 105, armature 6 and front contact of the GD relay 107, armature 2 and front contact of the PA relay 127, armature 1 and front contact of the YD relay 136 (operated from the armature 10 and front contact of the GD relay 107) the X wire 137, the front contact and armature 2 of the ST relay 114, the normally closed contacts of the Y–ON switch 138, the switch X stepping magnet 139 to battery.

The stepping of this switch in the X or primary direction is conventional and automatic and will continue through the automatic and alternate operations of the PA relay 127 and the stepping magnet 139 until the BST ground is detected by the XX brush 140, whereupon this ground is extended through the front contact and armature 9 of the GD relay 107 to trigger the operation of the XS relay 108, which first operates through its lower winding and then locks through its two windings in series to the ground on armature 5 of the GD relay 107, thereby stopping the X movement of the switch and starting the Y movement thereof.

The operation of the XS relay 108 opens the circuit of the PA relay 127 and the circuit of the YD relay 136. Thereupon the PA relay is operated in a new circuit in cooperation with the Y magnet 141, which may be traced from battery, winding of the PA relay 127, the back contact and armature 2 of the YS relay 106, the armature 2 and back contact of the YD relay 136, the armature 8 and front contact of the GD relay 107 over the circuit heretofore traced through the front contact and armature 2 of the ST relay 114 and the Y magnet interrupter springs 133. This operation of the PA relay 127 now closes a circuit for the Y magnet 141 over the Y wiper of the allotter switch, the armature 2 and front contact of the XS relay 108, the back contact and armature 1 of the YD relay 136, the front contact and armature 2 of the PA relay 127, the front contact and armature 6 of the GD relay 107, and the front contact and armature 1 of the SA relay 105 to battery.

Through these mutual control circuits the switch will step in the Y direction until the S brush of the line finder encounters battery (from the winding of the CO relay in the special line circuit 53) which is thereupon extended over the normally closed springs of the overflow switch 142, the YS wiper of the allotter switch, the armature 11 and the front contact of the GD relay 107, the armature 4 and back contact of the YD relay 136, and the lower winding of the YS relay 106 to ground. The YS relay 106 operates, opens the circuit for the PA relay 127, and closes a circuit from ground, the armature 1 and front contact of the YS relay 106, the front contact and armature 3 of the XS relay 108, the conductor 137, the front contact and armature 2 of the ST relay 114, the now operated contacts of the YON switch 138, the now operated springs of the XON switch 143, the closed contacts of the overflow switch 142, the winding of the SW switch through relay 135 to battery. The switch through relay operates and locks to the sleeve ground supplied by the TMG relay 120.

Figure 3:
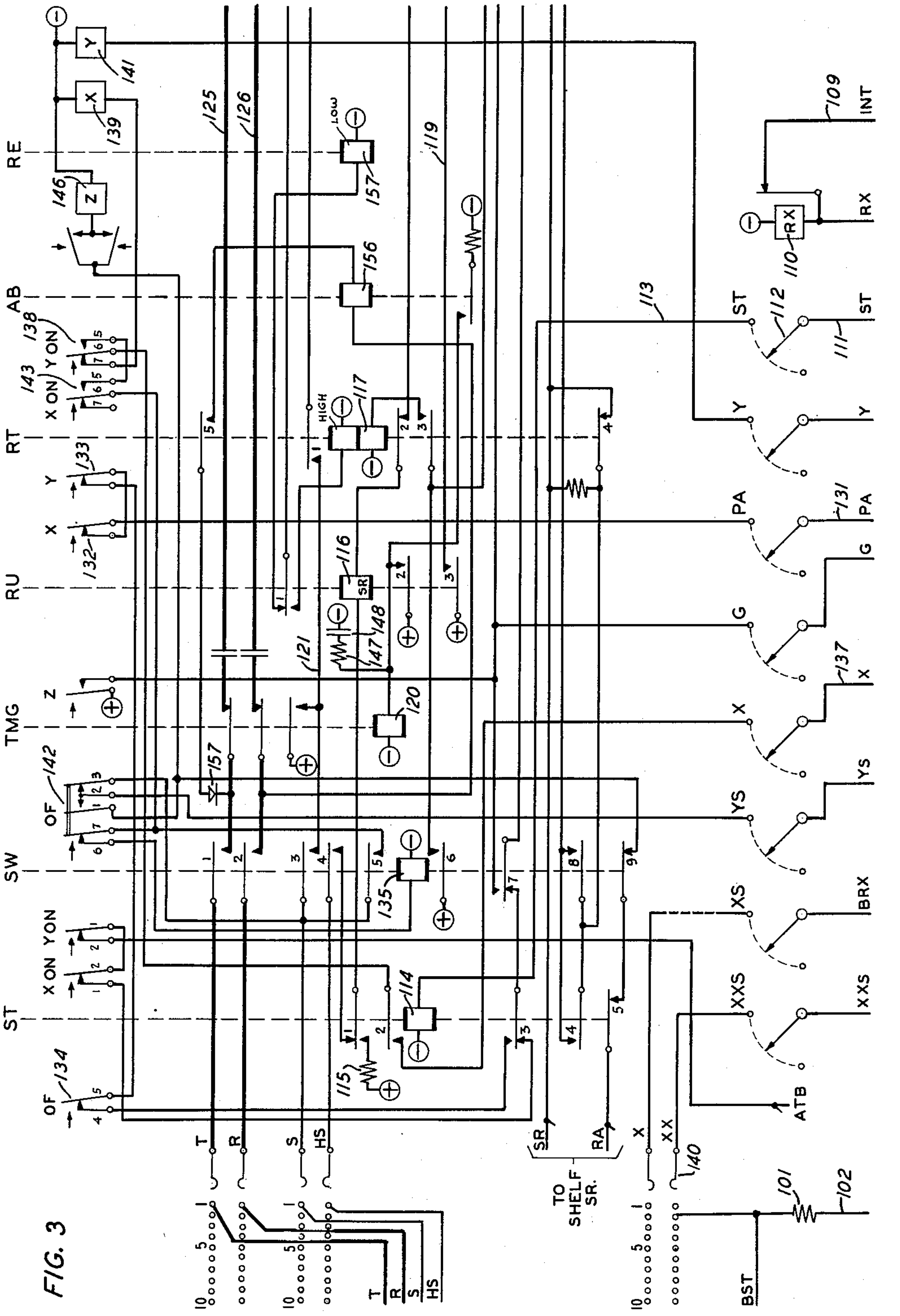
Fig. 3 is a schematic circuit diagram showing the line finder used to pick up a line on which an unanswered call has appeared.

The YS relay 106 at its armature 3 opens the circuit for the GD relay 107 and closes a direct circuit for the RX magnet 110. The release of the GD relay opens the circuit of the ST relay 114 and the YS relay 106 so that upon the release of the RX magnet 110 the line finder of the Fig. 3 is freed from the allotter. The return of ground over the sleeve brush of the line finder to the special line circuit operates the CO relay therein to release the line relay and remove the ground from the BST wire. The line finder is now connected to the calling line and this connection will be maintained until the operator at the answering bureau finally releases and removes the last ground (armature of RL relay 145) from the sleeve wire to release the SW relay 135 which will thereupon close a circuit from the RA ground over its armature 9 and back contact to the Z release magnet 146. This will be more fully set forth hereinafter.

*Calling line found*

When the calling line has been found, the SW relay 135 is operated as above explained and this relay through its armature 6 provides a ground connection over armature 2 and back contact of the CT relay 118 for the X contacts of the relays 122, 123 and 124 for holding purposes. The SW relay also closes the HS brush of the switch through its armature 4 to the circuit for the RU relay and the CT relay.

It will be noted that in accordance with the disclosure in my said copending application there is an optional wiring plan. Under option A a resistance ground will be applied periodically to the HS terminal, once for each ringing cycle and this is known as the delayed response plan, whereas under option B a dead ground is connected to this HS terminal, and this is known as the immediate response plan. It will shortly become apparent that under the immediate response plan, the CT relay will be operated as soon as the line is found, the SW relay 135 is operated and the ST relay is released. Under the delayed response plan, the resistance ground applied to the HS brush will not operate the CT relay 118 and so the operation of this relay must await a count down of the two step relays 122, 123 and 124. Under both plans the operation of the CT relay is necessary for further advance.

*Delayed response*

When the calling line has been found, if the release of the ST relay 114 occurs during a period when resistance ground is connected to the HS terminal, then the slow releasing RU relay 116 will remain operated but the CT relay 118 will remain unoperated. At the end of such a ringing cycle, the RU relay 116 will release and this removing ground from conductor 119 will allow the relay 122 to become fully operated through its two windings in series and its operated X contact. The full operation of this relay extends the conductor 119 to the next counting relay 122.

It may be noted that the TMG relay is shunted by a resistance 147 and a condenser 148 of values sufficient to hold this relay 120 operated after the release of the RU relay 166 over the remainder of the silent period of the ringing cycle so that as the RU relay repeatedly operates and releases, the TMG relay remains operated. It may be noted that the number of counting relays 122, 123 and 124 is a matter of choice. On the next application of ground to the conductor 119 after the last counting relay (relay 124 as shown) this ground will be forwarded through a chain circuit to the upper winding of the CT relay 118. Thus, under either wiring option, the CT relay 118 operates.

Upon the operation of the CT relay the counting relays are released, but the CT relay remains locked through its armature 4 and its upper winding. The CT relay establishes a connection between the upper winding of the RT relay 117 and the distant D relay 150 but the resistance of the RT relay 117 is comparatively high so that neither the RT relay nor the D relay operates at present. However, when the RU relay 116 releases, then the RE relay coil 157 of comparatively low resistance is substituted for the upper winding of the RT relay 117 and the D relay 150 becomes operated.

At the same time a circuit is established over the ring line conductor 126 including the RL relay 145 and the distant B relay 151 in series in which circuit both these relays respond. The B relay 151 closes a ground to the armature 1 of the D relay 150 whereby the lamp 152 will burn brightly when the RU relay is operated and will go dim by reason of resistance 153, when RU releases and causes the operation of the D relay 150. The operation of the D relay 150 represents the silent interval of the ringing cycle and its release represents the ringing interval. Hence, after a given interval and immediately following the operation of the CT relay 118 the lamp 152 will begin to flash, following the application of ringing current to the still unanswered line.

*Timing out*

If the call is answered by the subscriber before the answering bureau has answered or before it has been signaled, ringing ceases, causing the TMG relay 120 to release. This removes ground from the sleeve lead, thus causing the release of the SW relay 135 whereupon the CT relay 118 becomes released and the switch is released and the circuit returned to normal.

*Answering*

The call may only be effectively answered during a ringing period, that is while the D relay 150 is released and a ground on its armature 2 is connected through the armature 3 of the AN relay 154 to the S wire. The answering is effected by the movement of the talk key to a position where the contacts of this key may relax and thus connect the S wire to the S1 wire to cause the operation of the AN relay 154. This relay operates and locks in a circuit independent of the ground on the armature 3 of the AN–1 relay 155. The operation of the AN relay 154 allows the AN–1 relay 155 to operate and lock to the T conductor 125, thus releasing the D relay 150 and extinguishing the lamp 152.

The AN–1 relay is of comparatively low resistance so that the RT relay now responds and locks to the ground supplied by armature 6 of the SW relay. The RT relay opens the circuit of the RU relay 116 which releases and which in turn allows the release of the TMG relay 120. The RT relay 117 provides a holding ground from the armature of the RL relay 145 to hold the SW relay 135 after the release of the TMG relay 120.

The AB relay 156 now operates from the tip and ring of the calling line through the diode 157 and armature 5 and front contact of the RT relay 117. This bridge trips the ring trip relay in the distant connector and since the TMG relay 120 has closed the talking circuit to the talk key, the operator at the answering bureau may take a message. The calling line is held as long as the talking key is in its relaxed position and this includes the operation of the hold key when the operator may wish to leave the connection temporarily.

*Release*

When the answer key is restored, the circuit to the AN relay 154 is opened and this relay releases. This in turn opens the circuit of the B relay 151 and since the B relay has been held operated in series with the RL relay 145 both these relays release. The RL relay removes the ground from the sleeve wire so that the SW relay 135 is released. This extends the RA ground over armature and back contact of the SW relay to the Z release magnet 146 whereby the line finder is released and allowed to restore.

The tip and ring toward the calling subscriber now being opened, the AB relay 156 is opened so that this relay releases.

The SW relay 135, at its armature 6, removes the ground holding the CT relay 118 so that this relay releases and opens the signaling path between the RE coil 157 and the AN–1 relay 155 is opened and the AN–1 relay releases thus returning the circuits to normal.

*Exchange line*

It has been pointed out hereinbefore that in this type of answering service the identity of a calling line extended to the answering bureau is unknown to the operator. All she may know is that some one of the lines entering the circuit arrangement now has an unanswered call and that such line has been extended to her position over that link whose lamp 152 is showing the alternate bright and dim illumination characteristic of the timing of the ringing cycle.

Figure 7:
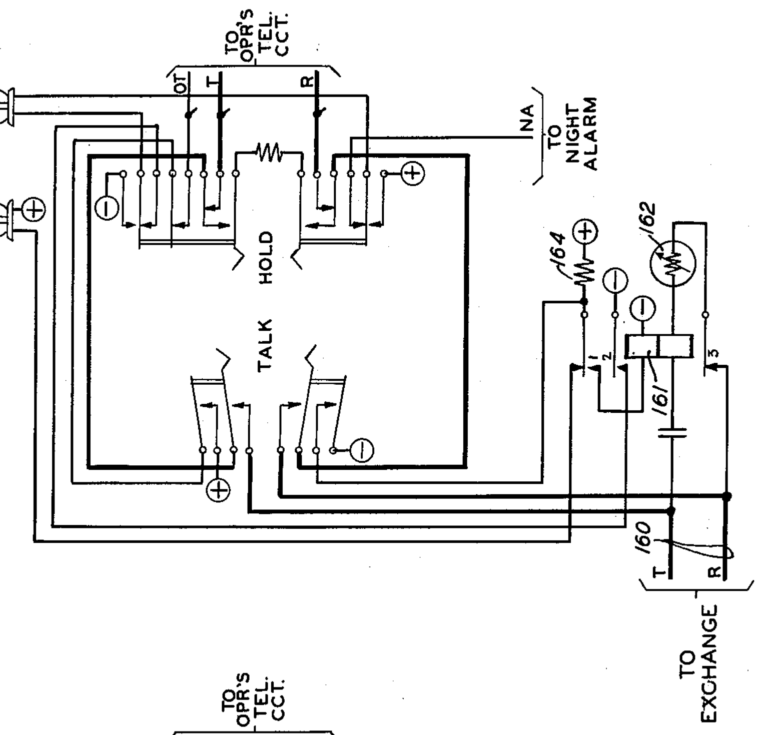
Fig. 7 is a schematic circuit diagram of an exchange line key termination by which an attendant may establish a separate connection.
Figure 6:
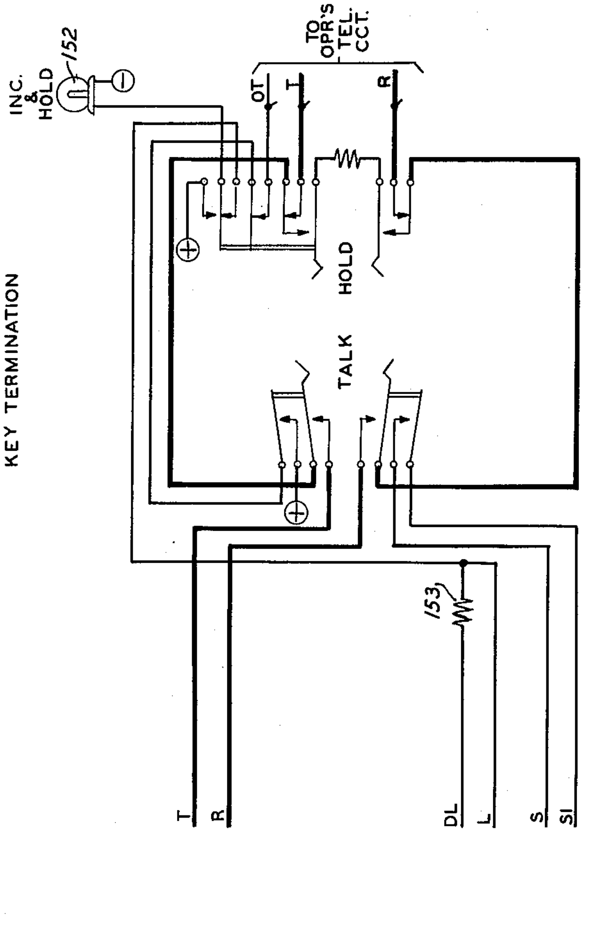
Fig. 6 is a schematic circuit diagram of an answering key termination for the trunk of Figs. 4 and 5 whereby an attendant may answer a call.

However, the operator is provided with an exchange line termination over which she may set up conventional calls, including calls to those lines which may be extended to her position for answering service. The circuitry for this is shown in Fig. 7. Here an incoming call over the line 160 transmits ringing current through the lower winding of relay 161 and the thermistor 162 and when the thermistor has heated sufficiently over a period indicating that the current is a genuine signal and not just a random spike, then the relay 161 operates and locks from ground on its armature 1. Armature 2 of this line relay 161 establishes a circuit through the lamp 162 to the night alarm ground. When the operator answers this incoming call and operates the talk key to its relaxed condition, the upper winding of the relay 161 will be shortcircuited and this relay will restore to normal. The resistor 164 allows the effective shortcircuiting of the upper winding of this relay. Thereupon the busy lamp 165 will come aglow as a signal that this particular exchange line is busy, even though the operator may have operated her associated hold key and left the connection for the time being.

It will be understood that the conductors marked as leading to the operator's telephone circuit provide conventional means whereby the operator may talk and signal over the exchange line.

What is claimed is:

1. In a telephone system, a plurality of subscriber lines, means for selectively and periodically applying ringing current to any of said subscriber lines, means for connecting each of said subscriber lines to individual bank terminals of an auxiliary line finder, means to connect said line finder to a circuit extending over a two wire line to a distant secretarial answering device for extending calls, incoming to one of said subscriber lines, to said device, means responsive to the application of ringing current to one of said subscriber lines a predetermined number of times for making said line finder operative to complete the connection from the one of said subscriber lines to which ringing current is applied to said two wire line, said two wire line connected, at said answering device, to signaling means and to means for seizure of said two wire line by an operator's telephone circuit, means controlled over said two wire line for operating said signaling means, and means also controlled over said two wire line responsive to seizure thereof by said operator's telephone circuit for preventing the release of said line finder.

2. In a telephone system, a plurality of subscriber lines, means for connecting each of said subscriber lines to individual bank terminals of an auxiliary line finder, means to connect said line finder to a circuit extending over a two wire line to a distant secretarial answering device for extending calls, incoming to one of said subscriber lines, to said device, said two wire line connected at said answering device to signaling means and to means for the seizure of said two wire line by an operator's telephone circuit, means responsive to the intermittent application of ringing current to one of said subscriber lines for causing said line finder to search for and connect with said one subscriber's line, means responsive to said line finder connecting with said one subscriber's line and controlled over said two wire line for operating said signaling means, means in said line finder responsive to the continued intermittent application of ringing current to said one subscriber's line for maintaining the connection between said line finder and said one subscriber's line, means in said line finder responsive to the seizure of said two wire line by said operator's telephone circuit at said answering device for establishing a holding means for said line finder independent of said ringing current control, and means also controlled over said two wire line responsive to seizure thereof by said operator's telephone circuit for preventing the release of said line finder.

3. A telephone system as claimed in claim 2, in which means are included in said auxiliary line finder for preventing the operation of said signaling means until a predetermined number of applications of ringing current have been applied to said subscriber's line, and means further responsive to the seizure of said two wire line by said operator's telephone circuit for terminating the application of ringing current to said one subscriber's line.

4. A telephone system as claimed in claim 2, in which said means responsive to the intermittent application of ringing current to a subscriber's line for maintaining said line finder in connection with said subscriber's line is further employed for intermittently operating said signaling means.

References Cited in the file of this patent

UNITED STATES PATENTS 1,967,408 Kahn ------------------ July 24, 1934